United States Patent
Cech et al.

(10) Patent No.: US 12,058,254 B2
(45) Date of Patent: Aug. 6, 2024

(54) METHOD FOR STORING KEY DATA IN AN ELECTRONIC COMPONENT

(71) Applicant: Siemens Aktiengesellschaft, Munich (DE)

(72) Inventors: Christian Cech, Ebreichsdorf (AT); Thomas Hinterstoisser, Bisamberg (AT); Martin Matschnig, Tulln (AT); Herbert Taucher, Vienna (AT)

(73) Assignee: SIEMENS AKTIENGESELLSCHAFT, Munich (DE)

(*) Notice: Subject to any disclaimer, the term of this patent is extended or adjusted under 35 U.S.C. 154(b) by 675 days.

(21) Appl. No.: 17/271,700

(22) PCT Filed: Jun. 25, 2019

(86) PCT No.: PCT/EP2019/066830
§ 371 (c)(1),
(2) Date: Feb. 26, 2021

(87) PCT Pub. No.: WO2020/043345
PCT Pub. Date: Mar. 5, 2020

(65) Prior Publication Data
US 2021/0320792 A1    Oct. 14, 2021

(30) Foreign Application Priority Data

Aug. 28, 2018    (EP) .................................... 18191073

(51) Int. Cl.
*H04L 9/08* (2006.01)
*G06F 21/76* (2013.01)

(52) U.S. Cl.
CPC ............ *H04L 9/0894* (2013.01); *G06F 21/76* (2013.01)

(58) Field of Classification Search
CPC ............................... H04L 9/0894; G06F 21/76
(Continued)

(56) References Cited

U.S. PATENT DOCUMENTS 7,675,313 B1 * 3/2010 Tang ....................... G06F 21/76
                                                      326/38
7,818,584 B1 * 10/2010 Joyce .................... H04L 9/0894
                                                      713/189

(Continued)

FOREIGN PATENT DOCUMENTS

CN    103378966    10/2013
CN    103493062     1/2014
(Continued)

OTHER PUBLICATIONS

International PCT Search Report dated Aug. 13, 2019 based on PCT/EP2019/066830 filed Jun. 25, 2019.
(Continued)

*Primary Examiner* — Dereena T Cattungal
(74) *Attorney, Agent, or Firm* — Cozen O' Connor

(57) ABSTRACT

A method for storing key data in an electronic component formed as an integrated programmable circuit, such as a field programmable gate array, which includes a base structure consisting of base elements, wherein configuration data is loaded, for each current program, onto the base elements and stored in a volatile matter, the key data is divided into key sub-data blocks, and a base element position is selected for each key sub-data block, where upon generating the configuration data for each current program or circuit function of the electronic component, selected base element positions of the key sub-data blocks are considered, while loading the configuration data, key sub-data blocks are stored in the base elements defined by selected base element positions, and after successfully programming the electronic component, the key sub-data blocks of base elements specified by
(Continued)

selected base element positions are ascertained and assembled to form the key data.

10 Claims, 2 Drawing Sheets

(58) Field of Classification Search
USPC .......................................................... 380/277
See application file for complete search history.

(56) References Cited

U.S. PATENT DOCUMENTS

| | | | | |
|---|---|---|---|---|
| 8,593,172 | B1* | 11/2013 | Jenkins, IV | H03K 19/177 |
| | | | | 326/38 |
| 8,627,105 | B2 | 1/2014 | Reese et al. | |
| 9,054,859 | B1* | 6/2015 | Streicher | H04L 9/0822 |
| 9,152,822 | B2 | 10/2015 | Reese et al. | |
| 9,270,458 | B2* | 2/2016 | Shibutani | H04L 9/0894 |
| 2001/0037458 | A1 | 11/2001 | Kean | |
| 2012/0278632 | A1 | 11/2012 | Reese et al. | |
| 2014/0089677 | A1* | 3/2014 | Reese | G06F 21/76 |
| | | | | 713/189 |
| 2017/0060866 | A1* | 3/2017 | Rudy | G06F 16/2255 |
| 2021/0083675 | A1* | 3/2021 | Chandra | G06F 11/3656 |
| 2022/0012338 | A1* | 1/2022 | Järvinen | H04L 9/0822 |
| 2023/0059746 | A1* | 2/2023 | Chun | H03K 19/1737 |

FOREIGN PATENT DOCUMENTS

| | | |
|---|---|---|
| CN | 106789070 | 5/2017 |
| EP | 1124330 A2 | 8/2001 |

OTHER PUBLICATIONS

EP Search Report dated Nov. 18, 2020 based on EP 18191073 filed Aug. 28, 2018.
Yalla P. et al: "Lightweight Cryptography for FPGAs", Reconfigurable Computing and FPGAS, 2009. Reconfig '09. International Conference On, IEEE, Piscataway, NJ, USA, pp. 225-230, 2009.
Xilinx: "Spartan-3 FPGA Family Data Sheet" ( ver3 .1), pp. 1-4; 2013.
Anonymous: "Field-programmable gate array Wikipedia", 2018.

* cited by examiner

METHOD FOR STORING KEY DATA IN AN ELECTRONIC COMPONENT

CROSS-REFERENCE TO RELATED APPLICATIONS

This is a U.S. national stage of application No. PCT/EP2019/066830 filed 25 Jun. 2019. Priority is claimed on European Application No. 18191073.8 filed 28 Aug. 2018, the content of which is incorporated herein by reference in its entirety.

BACKGROUND OF THE INVENTION

1. Field of the Invention

The present invention generally concerns the field of electronic systems and circuits, in particular programmable integrated circuits, such as field programmable gate arrays (FPGAs) and, more specifically, relates to a method for storing key data in an electronic component that is formed as a programmable integrated circuit, in particular as a field programmable gate array or FPGA, and has a basic structure consisting of a multiplicity of base elements, where configuration data for a respective current programming or circuit function of the electronic component are loaded from a configuration memory into the respectively used base elements and are stored therein in a volatile fashion manner.

2. Description of the Related Art

Integrated circuits, such as application-specific integrated circuits (ASICs) or field programmable gate arrays (FPGAs), are electronic components that are used in many electrical and/or electronic devices or systems today.

In particular, electronic components that are formed as programmable or reconfigurable integrated circuits (e.g., FPGAs) can be used, via appropriate configuration, to produce various logic circuits and functions that can extend, for example, from simple counters or interfaces for digital chips through to highly complex circuits, such as memory controllers or microprocessors. Programmable or reconfigurable in this case relates not only to a stipulation of timings but also, in particular, to a definition of a circuit structure for achieving a desired circuit and/or circuit function. This definition is formulated in a design phase, e.g., via a hardware description language (e.g., VHDL, or Verilog) and translated by producer software or via a synthesis tool, in a synthesis phase, into a network list, from which a physical layout is finally produced via placement and routing. The bit file corresponding to this network list provides the configuration data that stipulate how the physical elements of the programmable integrated circuit or of the electronic component are intended to be connected up or configured.

By loading the configuration data into a programmable integrated circuit (e.g., FPGA), it is possible to take the basic structure of the programmable integrated circuit as a basis for producing various logic circuits and/or circuit functions and altering or reconfiguring them as required. The essential basic structure of a programmable integrated circuit, such as an FPGA, is an array of base elements. An FPGA today can consist of up to several ten thousand base elements, for example.

A base element of a programmable integrated circuit normally consists of an easily programmable logic circuit and a 1-bit register, usually formed as a flip-flop. The logic circuit can be formed, for example, as a combination of different logic gates that can be combined with one another via electronic switches in accordance with the function desired by the developer. Alternatively, the logic circuit of a base element can be formed, e.g., as a programmable lookup table (LUT) that is used to explicitly produce a desired logic function (e.g., NAND, XOR, AND, or multiplexer). The desired logic function of a base element is then programmed by depositing a defining truth table in a configuration or memory cell assigned to the base element, and functions are calculated by reading the memory address determined by the inputs.

The configuration or memory cells of a programmable or reconfigurable circuit can be established as static RAM or SRAM cells, which are loaded with the appropriate configuration data for the respective base element by a boot process before the respective use. The SRAM cells lose their content when a supply voltage is switched off, i.e. the configuration data are stored only in volatile fashion, Consequently, the programmable integrated circuit needs to be reconfigured or reprogrammed whenever it is switched on. Here, the respective configuration data can be loaded from an internal or external, nonvolatile memory unit (e.g., a type of EPROM).

However, such SRAM-based circuits, such as SRAM-based FPGAs, normally have no way of storing security-relevant data, such as cryptographic key data, permanently and securely in the programmable logic or in the programmable integrated circuit. One possibility is therefore, e.g., to use an external security chip in which the respective cryptographic key data are filed. However, this requires additional encryption between the security chip and the programmable integrated circuit to prevent inadmissible reading of the key data. Furthermore, the use of an external security chip has the disadvantages of additional costs and a usually rather low data transmission rate between the security chip and the electronic component or integrated circuit.

A further possibility for secure key data is, for example, the use of physical unclonable functions (PUFs), as described, e.g., in the document: J. Guajardo et al. "Anti-counterfeiting, key distribution, and key storage in an ambient world of physical unclonable functions", Information Systems Frontiers, vol. 11, issue 1, pp. 19-41, March 2009. In this case, key data can be reconstructed, e.g., by using correction circuits (e.g., fuzzy extractors) and auxiliary data from specific data of the integrated circuit or of the electronic component itself, such as initial values of the configuration cells or runtime properties. This reconstruction is dependent on the respective physical electronic component, however. Furthermore, this reconstruction requires additional resources of the integrated circuit.

In order for example to permanently deposit key data, in particular for decrypting the configuration data (binary file of the configuration) when they are loaded into the basic structure of the component, in such components or circuits, or to be able to prevent reconstruction thereof via illegal access to the circuit, it is possible, as described, e.g., in the documents: Austin Lesea, "IP Security in FPGAs" Xilinx White Paper: Virtex-4 and Virtex-5 Devices, 2007, or Ching Hu, "Solving Today's Design Security Concerns" Xilinx White Paper: FPGAs, 2010, page 8, to use either battery-buffered memory cells, in particular battery-buffered RAMs, or eFuse cells.

However, the use of a battery-buffered memory cell requires provision for a constant power supply, e.g., via a battery, because otherwise the content of the memory cell is lost. Furthermore, it is necessary for example to provide further protective mechanisms, e.g., against sabotage and/or illegal reading and reconstruction, such as erasure of the key data when a security problem is discovered. Alternatively, eFuse cells can be used for storing the key data. However, structures comprising eFuse cells can easily be identified in the electronic component on account of their energy requirements and reconstructed via reverse engineering.

Alternatively, instead of an SRAM-based integrated circuit, it is also possible to use what is known as a flash-based integrated circuit (e.g., flash-based FPGA). A flash-based circuit involves flash memory cells being used as configuration cells which, in contrast to SRAM memory cells, allow nonvolatile storage of data (e.g., the configuration data). Such flash-based circuits provide the option of filing key data in a secure flash memory unit, for example. Here, the key data remain stored even in a deenergized state, i.e., permanently, and are normally not easily readable. However, the use of a flash-based component or a flash-based integrated circuit entails relatively high costs, additional complications and possibly higher susceptibility to error.

The document "Lightweight Cryptography for FPGAs" by Panasayya Yalla and Jens-Peter Kaps (2009 International Conference on Reconfigurable Computing and FPGAs—DOI 10.1109/ReConFig.2009.54) discloses a block encryption method for FPGAs in which the plain text and the encrypted text are divided into 8-bit blocks and the 128-bit key data are likewise divided into 8-bit blocks, where base elements are defined for the implementation of the algorithm in the FPGA and where the key data for the block encryption algorithm can be stored in a dynamic RAM store or a shift register.

SUMMARY OF THE INVENTION

In view of the foregoing, it is therefore an object of the invention to provide a method for storing cryptographic key data in an electronic component formed as a programmable integrated circuit via which cryptographic key data can be easily and inexpensively stored securely and more or less permanently in programmable logic or in the electronic component without additional complication.

This and other objects and advantages are achieved in accordance with the invention by a method for storing cryptographic key data in an electronic component that is formed as a programmable or reconfigurable integrated circuit, in particular as a field programmable gate array (FPGA), and has a basic structure consisting of base elements, i.e., as an array. Configuration data for a respective current programming with a stipulated circuit function are loaded into the respective base elements of the electronic component that are used for the respective circuit function and are stored in a volatile manner. The cryptographic key data are divided into key data subblocks, e.g., in a design phase, and a base element position in the basic structure of the electronic component is furthermore selected for each of the key data subblocks. In this case, it is advantageous if the base element positions selected for the respective key data subblocks are filed in a lockout data element or in a lock constraint file. The creation of the configuration data for the respective current programming or circuit function of the electronic component takes into consideration the selected base element positions of the key data subblocks, where the selected base element positions from the lockout data element are incorporated into the configuration data of the respective current programming via a constraint file. The loading of the configuration data for the respective current programming of the electronic component involves the key data subblocks being filed in those base elements that are defined by the selected base element positions filed in the lockout data element. After the electronic component has been programmed the key data subblocks are ascertained from the respective base elements stipulated by the selected base element positions and are assembled to form the key data.

The main aspect of the method in accordance with the invention is that the cryptographic key data are deposited more or less permanently in the respective current programming or in the respective circuit function of the electronic component easily and securely and without additional complication. However, the key data are not stored permanently, e.g., at a readable position (e.g., external or internal memory) of the electronic component or in the source code or in the configuration data of the respective current programming, but rather are extracted from the basic structure of the electronic component based on the selected or stipulated base element positions, and assembled, only during operation of the electronic component, i.e. at runtime. The key data therefore cannot be ascertained without knowledge of the stipulated base element positions. The base elements in which key data subblocks are filed are decided only when the configuration data for the respective current programming or circuit function of the electronic component are loaded by the selected base element positions. That is, although the selected base element positions are taken into consideration for the creation of the configuration data so that these positions are available, they are not filed in the configuration data and are therefore independent thereof or of the source code of the respective current programming. The key data therefore cannot be correctly reconstructed without knowledge of the selected base element positions.

A lockout data element or a lock constraint file allows absolute placements, e.g., of design elements within the basic structure of the electronic component to be specified and defined when creating a programming or current circuit function for a programmable integrated circuit, such as in a design phase. It is then possible for, e.g., an individual position, multiple positions or one or more position ranges to be specified in the lockout data element that are locked out, or defined for specific design elements, during the creation of the configuration data for the circuit, e.g., during a synthesis phase. The respective base element position in the basic structure can be indicated and ascertained, for example, in the form of Cartesian coordinates (x and y coordinates). The lockout data element or the lock constraint file easily fixes the base element positions at which the key data subblocks are deposited and from which they can be extracted at runtime.

The creation and loading of the configuration data then take into consideration the base element positions filed in the lockout data element. For example, a current programming and/or the associated configuration data can certainly be copied and, e.g., executed on another electronic component without knowledge of the lockout data element. However, no changes can be made to the source code or the configuration data (e.g., network list) without knowledge of the lockout data element, because the key data cannot then be correctly reconstructed. The reason is that any change would require a new translation of the circuit function, which results in new configuration data. These new configuration data would return incorrect key data without knowledge of the lockout data element or the lock constraint file, however.

The lockout data element in which the base element positions selected for the key data subblocks are filed is ideally filed (best of all in encrypted form) in a permanent memory. The separate and ideally encrypted storage means that the base element positions of the key data can be elicited, e.g., in the event of a security attack on the electronic component, only with great difficulty. The use of a permanent memory (e.g., flash memory) means that the lockout data element is not lost even when the operating voltage is switched off.

It is furthermore beneficial if the cryptographic key data are divided into key data subblocks such that the respective key data subblock can be filed in precisely one base element of the basic structure. This means that the key data are divided into key data subblocks, as far as a data size is concerned, are configured such that the respective key data subblock can be placed in precisely one base element or in an associated dynamic configuration cell. The applicable base element is then stipulated by the selected base element position in the basic structure.

In one preferred embodiment of the invention, it is advisable if a selection regarding the base element positions for the key data subblocks is made in accordance with a random principle. That is, the base element positions in the basic structure for the key data are defined randomly and arbitrarily. The positions of the key data in the basic structure of the electronic component can therefore be ascertained only with difficulty by a potential attacker, for example, because the positions do not have, e.g., a reproducible pattern, and the like.

Furthermore, it is advisable if the base element of the basic structure of the electronic component is formed by a lookup-table or LUT unit and an assigned dynamic configuration cell. To provide the respective current circuit function, appropriate configuration data for the respectively used base element are filed in a dynamic configuration cell belonging to the base element, which configuration cell belongs to the configuration memory of the electronic integrated circuit and the content of which is loaded into the LUT unit of the base element when the electronic integrated circuit starts up. A LUT unit in digital circuitry or in electronic integrated circuits is a logic unit that can be used to provide a desired function (e.g. AND, OR, NOR, XOR or else more complex functions) by loading an appropriate associated configuration, particularly in the form of a logic table, from the associated configuration memory cell when the circuit starts up.

It is beneficial if the configuration cell of the respective base element is formed as static RAM. A static RAM is an electronic volatile memory chip that retains data information filed in it for as long as the operating voltage is applied. Alternatively, the configuration cells can also be formed as flash memories, which allow nonvolatile storage for simultaneously low power consumption.

In one preferred embodiment of the method in accordance with the invention, the key data subblocks are read from the respective base elements by a control unit via a configuration interface of the electronic component by using information about the selected base element positions and are assembled to form the key data. The configuration interface is, e.g., a special interface, stipulated by the manufacturer of the electronic component, via which the control unit (a controller) ascertains, during operation of the electronic component or at runtime, the content filed in the base elements or in the associated configuration cells, which content by the selected base element positions, and assembles said content to form the cryptographic key data.

Alternatively or additionally, the key data subblocks can be read from the respective base elements with the aid of a separate application and assembled to form the key data, where the application uses information about the selected base element positions. The content of the base elements or associated configuration cells situated at the selected base element positions is read by an application and assembled to form the key data in this case. The application can be embodied as an executable software unit that is filed in an internal memory unit of the electronic component or in an external memory unit.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained below by way of illustration on the basis of the accompanying figures, in which.

DETAILED DESCRIPTION OF THE EXEMPLARY EMBODIMENTS

Figure 1:
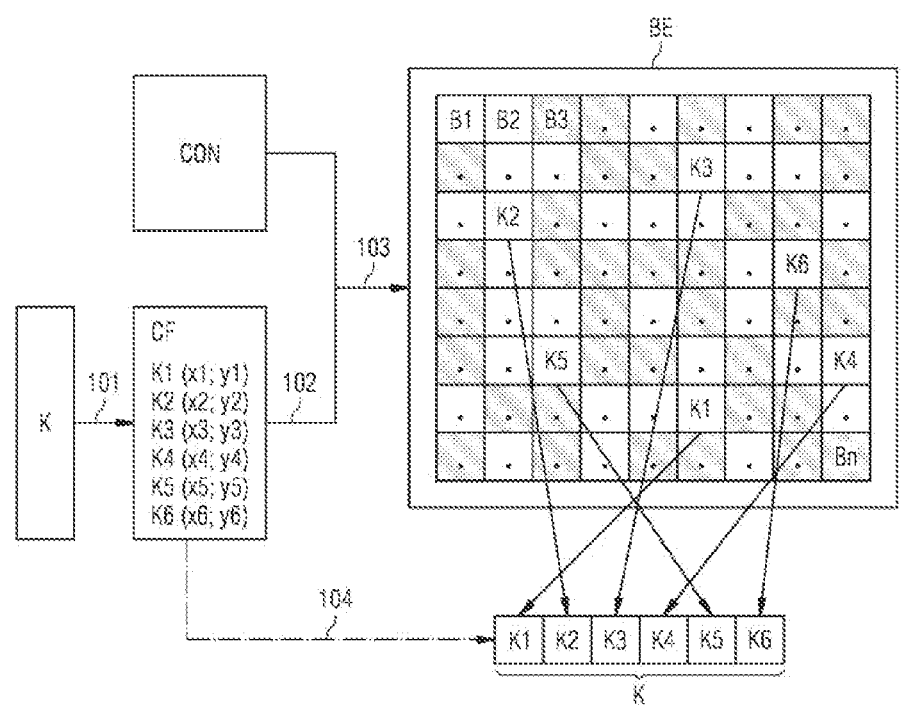
FIG. 1 shows an illustrative sequence for the method in accordance with the invention for storing cryptographic key data in an electronic component.

FIG. 1 schematically shows an illustrative electronic component BE. This electronic component BE is formed as a programmable or reconfigurable integrated circuit, such as a field programmable gate array (FPGA). The electronic component BE therefore has a basic structure that also consists of a multiplicity of base elements B1, B2, B3, . . . , Bn, which are depicted by way of illustration in FIG. 1.

Such a base element B1, B2, B3, . . . , Bn of the basic structure of the electronic component BE can be formed, for example, by a lookup-table or LUT unit and an assigned dynamic configuration unit. The configuration unit can be, e.g., formed as static RAM in which a current configuration of the LUT unit is stored in a volatile manner.

Configuration data CON for a current programming or circuit functionality of the electronic component BE are loaded into the base elements B1, B2, B3, . . . , Bn. To this end, e.g., a hardware description language (e.g., VHDL, or Verilog) is used, e.g., in a design phase to define a circuit structure that stipulates the desired circuit function for the electronic component BE. In a synthesis phase, this circuit structure is translated into a network list by producer software or a synthesis tool. A bit file corresponding to this network list then forms the configuration data CON, for example, which stipulate which of the base elements B1, B2, B3, . . . , Bn are intended to be used for the respective current programming and how the base elements B1, B2, . . . of the electronic component BE that are used are intended to be configured or connected up. In the component BE depicted by way of illustration in FIG. 1, base elements B1, B2, . . . that are used for a current programming or circuit function are depicted in white and unused base elements B3, Bn, . . . are provided with shading, for example.

The method in accordance with the disclosed embodiments of the invention involves cryptographic key data K that are needed, e.g., during a runtime of the integrated circuit or of the electronic component BE being divided into key data subblocks K1, K2, . . . , K6 in a division step 101. An individual key data subblock K1, K2, . . . , K6 can have, e.g., a data size such that the respective key data subblock K1, K2, . . . , K6 can be filed in precisely one base element B1, B2, B3, . . . , Bn of the electronic component or in the respective dynamic configuration cell belonging to the base element B1, B2, B3, . . . , Bn.

In a selection step 102, base element positions in the basic structure of the electronic component BE are selected for the respective key data subblocks K1, K2, . . . , K6. The selection of the respective base element positions can be performed according to a random principle, for example. The respective base element position in the basic structure for the respective key data subblock K1, K2, K3, . . . , K6 can be indicated in the form of Cartesian coordinates (x and y coordinates), for example. As such, e.g., a first key data subblock K1 can be assigned a base element with a first coordinate pair x1, y1, a second key data subblock K2 can be assigned a base element with a second coordinate pair x2, y2. The x coordinate x1, x2, indicates, e.g., a row in the basic structure of the electronic component BE in which the respective base element B1, . . . , Bn is arranged. The y coordinate y1, y2, indicates, e.g., a column in the basic structure of the electronic component BE in which the respective base element B1, . . . , Bn is located. The base element positions or corresponding coordinates x1, y1; x2, y2; . . . ; x6, y6 selected for the key data subblocks K1, K2, . . . , K6 can be filed, for example, in a lockout data element CF or a lock constraint file to fixedly define or lock out the positions of the key data subblocks K1, K2, . . . , K6 in the basic structure. The lockout data element CF can be filed, ideally in encrypted form, such as in a permanent memory.

The division step 101 and the selection step 102 of the method according to the invention can be performed for example during or after a design phase for the respective current programming or circuit function of the electronic component BE. On creation of the configuration data for the current programming of the electronic component BE, i.e., during the synthesis phase, the selected base element positions x1, y1; . . . ; x6, y6 of the key data subblocks K1, . . . , K6 are taken into consideration. That is, for example, the position information x1, y1; . . . ; x6, y6 from the lockout data element CF is incorporated into the current configuration data CON. These base element positions x1, y1; . . . ; x6, y6 are then unusable or locked out, e.g., for placement of other design elements or functions.

At a loading step 103, the configuration data CON that are currently generated, e.g., via synthesis, are loaded into the base elements B1, B2, B3, . . . , Bn for the current programming or circuit functionality. Here, the respective key data subblocks K1, . . . , K6 are filed in those base elements that were stipulated by the selected base element positions x1, y1; . . . ; x6, y6. That is, the first key data subblock K1 is filed in a base element with a first base element position x1, y1, and the second key data subblock K2 is filed in a base element with a second base element position x2, y2, and the like. Filing can be accomplished by using the dynamic configuration cell of the respective base element at the respective base element position x1, y1; . . . ; x6, y6, for example.

In a reconstruction step 104, following successful programming of the electronic component BE, the key data K are then reassembled from the key data subblocks K1, K2, . . . , K6 at runtime. The key data subblocks are read from the respective base elements B1, . . . , Bn, or from the respective associated configuration cells, at the stipulated base element positions x1, y1; . . . ; x6, y6. This can be accomplished by using the lockout data element CF, or the position information x1, y1; . . . ; x6, y6 filed therein, of the key data subblocks K1, . . . , K6. The key data subblocks K1, . . . , K6 can be read from the base elements or the associated configuration cells, for example, by a control unit or a controller via a special configuration interface of the electronic component BE. The information regarding which base elements B1, . . . , Bn or associated configuration cells need to be read by the control unit for the key data K is then provided by the lockout data element CF or the lock constraint file CF.

Alternatively or additionally, a separate application that is used in the reconstruction step 104 reads the key data subblocks K1, . . . , K6 from the respective base elements B1, . . . , Bn, or the associated configuration cells, defined by the selected base element positions x1, y1; . . . ; x6, y6 and assembles them to form the key data K. The information about the applicable base element positions x1, y1; . . . ; x6, y6 is likewise provided by the lockout data element CF or the lock constraint file CF. The application can be formed as an executable software unit or software application filed in an internal memory unit of the electronic component or in an external memory unit.

As a result of the method in accordance with disclosed embodiments of the invention, the cryptographic key data K are never stored directly in a source code or in the configuration data CON of a current programming of the electronic component BE, but rather are extracted from the base elements B1, . . . , Bn at selected base element positions x1, y1; . . . ; x6, y6, and assembled, only at runtime. The respective positions x1, y1; . . . ; x6, y6 of the key data subblocks K1, . . . , K6 are defined using the lockout data element CF or the lock constraint file CF only when the configuration data CON are loaded or the logic elements of the current programming are placed in the basic structure of the electronic component BE. The positions x1, y1; . . . ; x6, y6 of the key data subblocks K1, . . . , K6 are therefore independent of the current source code or the current configuration data CON, and the key data K are not reconstructable without knowledge of the lockout data element CF or the lock constraint file CF.

Figure 2:
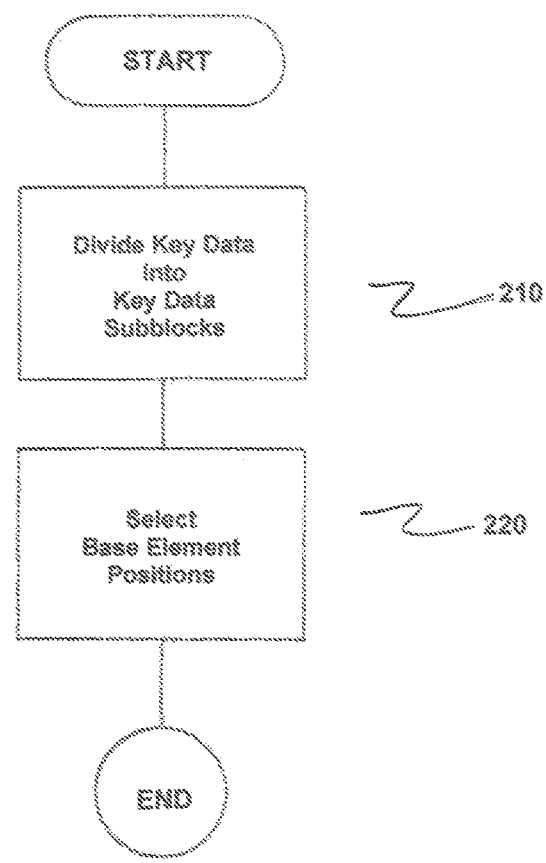
FIG. 2 is a flowchart of the method in accordance with the invention.

FIG. 2 is a flowchart of the method for storing key data in an electronic component BE comprising a programmable integrated circuit, in particular as a field programmable gate array or FPGA, where the electronic component has a basic structure consisting of base elements B1, . . . , Bn, and where configuration data CON for a respective current programming of the electronic component BE is loaded into the respective base elements B1, . . . , Bn and is stored in volatile fashion. The method comprises dividing 101 the key data K into key data subblocks K1, . . . , K6, as indicated in step 210.

Next, a base element position in the basic structure of the electronic component BE is selected 102 for each key data subblock K1, . . . , K6, were the base element positions selected for the respective key data subblocks K1, . . . , K6 are filed in a lockout data element CF, as indicated in step 220.

In accordance with the invention, the creation of the configuration data CON for the respective current programming of the electronic component BE takes into consideration 102 the base element positions selected for the key data subblocks K1, . . . , K6 such that the selected base element positions from the lockout data element CF are incorporated into the configuration data of the respective current programming via a constraint file. In addition, the loading of the configuration data CON for the respective current programming into the electronic component BE comprising filing 103 the key data subblocks K1, . . . , K6 in those base elements that are stipulated by the selected base element positions filed in the lockout data element CF. Furthermore, after the electronic component BE has been programmed the key data subblocks K1, . . . , K6 are ascertained from the respective base elements B1, . . . , Bn stipulated by the selected base element positions and are assembled 104 to form the key data K.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for storing key data in an electronic component comprising a programmable integrated circuit, said electronic component having a basic structure consisting of base elements, wherein configuration data for a respective current programming of the electronic component being loaded into the respective base elements and being stored in an erasable manner, the method comprising:
   dividing the key data into key data subblocks; and
   selecting a base element position in the basic structure of the electronic component for each key data subblock, the base element positions selected for the respective key data subblocks being filed in a lockout data element;
   wherein creation of the configuration data for the respective current programming of the electronic component takes into consideration the base element positions selected for the key data subblocks such that the selected base element positions from the lockout data element are incorporated into the configuration data of the respective current programming via a constraint file;
   wherein the loading of the configuration data for the respective current programming into the electronic component comprising filing the key data subblocks in those base elements which are stipulated by the selected base element positions filed in the lockout data element; and
   wherein after the electronic component has been programmed the key data subblocks are ascertained from the respective base elements stipulated by the selected base element positions and are assembled to form the key data.

2. The method as claimed in claim 1, wherein the lockout data element is filed in a permanent memory in encrypted form.

3. The method as claimed in claim 1, wherein the key data are divided into key data subblocks such that the respective key data subblock is fileable in precisely one base element of the basic structure.

4. The method as claimed in claim 2, wherein the key data are divided into key data subblocks such that the respective key data subblock is fileable in precisely one base element of the basic structure.

5. The method as claimed in claim 1, wherein a selection regarding the base element positions for the key data subblocks is made in accordance with a random principle.

6. The method as claimed in claim 1, wherein a base element of the basic structure of the electronic component is formed via a lookup-table (LUT) unit and an assigned dynamic configuration cell.

7. The method as claimed in claim 6, wherein the configuration cell of the base element is formed as static RAM.

8. The method as claimed in claim 1, wherein the key data subblocks are read from the respective base elements by a control unit via a configuration interface of the electronic component utilizing information about the selected base element positions and are assembled to form the key data.

9. The method as claimed in claim 1, wherein the key data subblocks are read from the respective base elements aided by a separate application and are assembled to form the key data (K); and wherein the application utilizing information about the selected base element positions.

10. The method as claimed in claim 1, wherein the programmable integrated circuit comprises a field programmable gate array (FPGA).

* * * * *